United States Patent [19]

Lecomte et al.

[11] Patent Number: 4,567,589

[45] Date of Patent: Jan. 28, 1986

[54] ELECTRONIC DIGITAL PCM TIME-DIVISION EXCHANGE WITH DECENTRALIZED ARCHITECTURE

[75] Inventors: Daniel Lecomte, Paris; Michel Gibaud, Herblay, both of France

[73] Assignee: Thomson CSF-Telephone, Paris, France

[21] Appl. No.: 545,009

[22] Filed: Oct. 24, 1983

[30] Foreign Application Priority Data

Oct. 26, 1982 [FR] France .................................. 8217914

[51] Int. Cl.[4] ............................................ H04Q 11/04
[52] U.S. Cl. .......................................... 370/58; 370/67
[58] Field of Search ....................... 370/58, 85, 67, 68

[56] References Cited

U.S. PATENT DOCUMENTS 4,322,843 3/1982 Beuscher et al. ...................... 370/58
4,455,645 6/1984 Mijioka et la. .......................... 370/58
4,466,095 8/1984 Kawano et al. ....................... 370/58

OTHER PUBLICATIONS

T. Uchiyama et al., "Digital Data Switching Control System", Review of the Electrical Commun. Lab., vol. 28, No. 5-6, May-Jun. 1980, pp. 338-349.

Primary Examiner—Douglas W. Olms
Assistant Examiner—Wellington Chin
Attorney, Agent, or Firm—Cushman, Darby & Cushman

[57] ABSTRACT

A PCM time division exchange with decentralized processing having a central processing unit connected by means of a switching network to several racks, each rack has a message microcontroller and several port cards. The message microcontroller is responsible for the signal dialogue between the different ports and it exchanges telephone messages with the central processing unit.

10 Claims, 3 Drawing Figures

ELECTRONIC DIGITAL PCM TIME-DIVISION EXCHANGE WITH DECENTRALIZED ARCHITECTURE

BACKGROUND OF THE INVENTION (1) Field of the Invention

This application is related to Application Ser. No. 538,574 by the same inventors, filed Oct. 3, 1983 and titled "ELECTRONIC PCM DIGITAL TIME DIVISION EXCHANGE WITH A MODULATABLE CAPACITY.

The present invention relates to an electronic digital PCM time-division exchange with decentralized architecture.

(2) Description of the Prior Art

Generally, a telephone exchange comprises a group of ports, such as subscriber's line equipment, network junctors, etc. These ports are connected to two signal reception and transmission busses respectively. It is then necessary to use a switching network for switching the data from the transmission bus to the reception bus at precise moments and thus permit a bidirectional conversation between two ports. When the capacity of the exchange with regards to the number of ports increases, it is necessary to increase the capacity of the switching network to the same extent. In general, the ports and the switching network are supervised and controlled by a central computer, normally constituted by a microprocessor, an associated program memory and a data memory. When the capacity of the number of ports increases, it is necessary, wherever possible, to increase the power of the central computer by adding processors and the central computer acts as a multiprocessor. However, this solution has the disadvantage of requiring, even in the case of a small exchange which can subsequently undergo a significant capacity increase, a detailed study of the software and hardware for multiprocessor operation. This system becomes more complex as the exchange capacity increases.

SUMMARY OF THE INVENTION

The present invention relates to a PCM digital time-division exchange with decentralized calculating power, thus making it possible to progressively increase the number of exchange ports by a corresponding progressive increase in the calculating power in a decentralized manner, in the case of monoprocessor operation.

The exchange according to the invention comprises a computer or central processing unit connected by means of a switching network to one or more racks of ports, each rack having a signalling microcontroller, a circuit for the selection of the transmission and reception times of the ports, a circuit for transmitting signals to and from the ports, and a circuit for transmitting messages to and from the central processing unit of the exchange.

BRIEF DESCRIPTION OF THE DRAWINGS

The present invention is described in greater detail hereinafter relative to non-limitative embodiments and the attached drawings, which show.

DESCRIPTION OF THE PREFERRED EMBODIMENT

Figure 1:
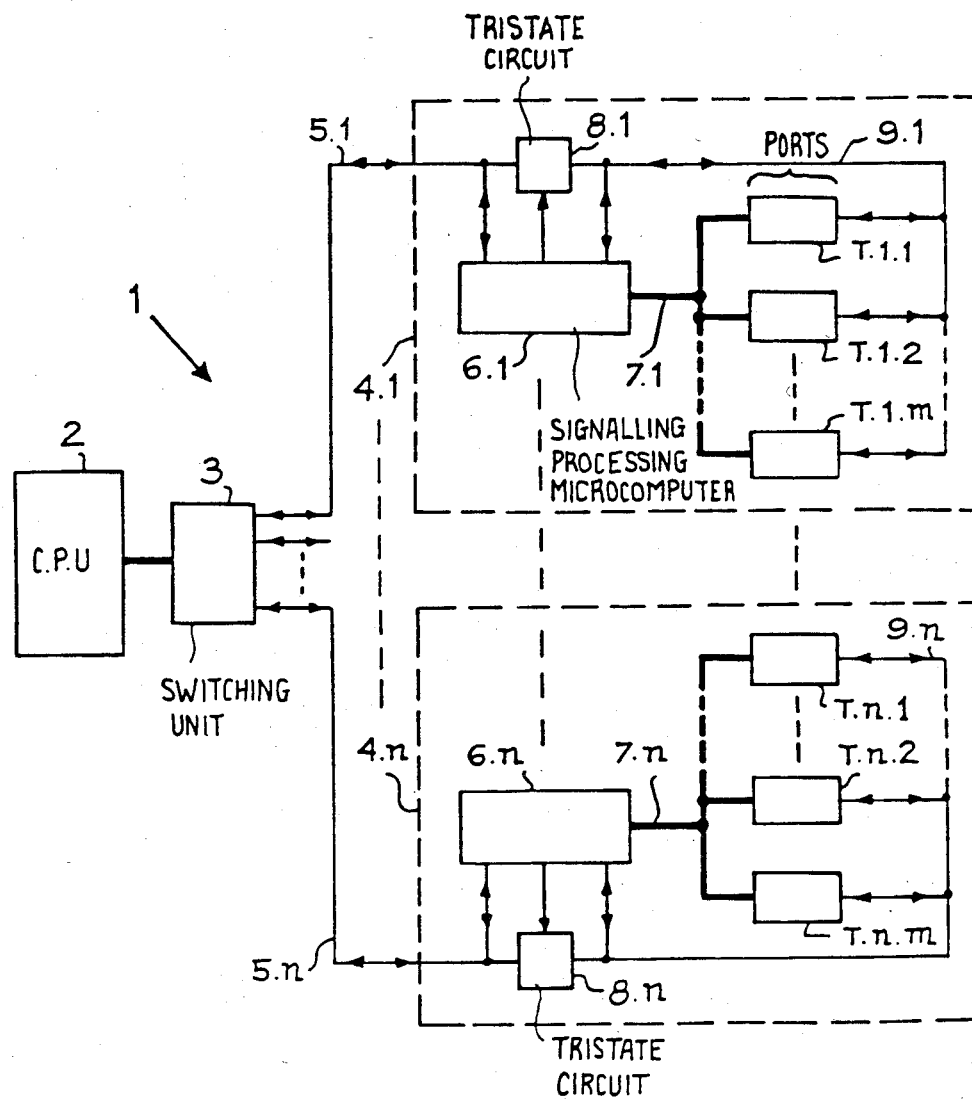
FIG. 1 a simplified block diagram of an exchange according to the invention.

The exchange 1 diagrammatically shown in FIG. 1 is a private exchange having an average capacity, of e.g. between a few dozen and approximately 600 ports. The exchange 1 essentially comprises a central processing unit 2 controlling a switching network 3 connected to n racks, designated 4.1 to 4.n. The switching network 3 is connected to the racks by n bidirectional PCM junctions 5.1 to 5.n.

Each rack has a signalling processing microcontroller, respectively designated 6.1 to 6.n, whose transmission and reception time selection output is connected by a bus 7.1 to 7.n, to m port cards in each rack, said cards being respectively T.1.1 to T.1.m for the first rack up to T.n.1 to T.n.m for the rack n. In each rack, the PCM bidirectional junction 5.1 to 5.n, is connected to the corresponding microcontroller, as well as to a tri-state circuit, respectively designated 8.1 to 8.n, controlled by the corresponding microcontroller. The signalling output and input of each microcontroller 6.1 to 6.n are connected, in a corresponding rack, by a bidirectional PCM junction, respectively designated 9.1 to 9.n, to the circuits 8.1 to 8.n, as well as to the data and signalling inputs and outputs of all the ports of the racks in question. In the aforementioned example, it has been assumed that each rack has m port cards. However, it is obvious that the racks can have different numbers of port cards.

Figure 2:
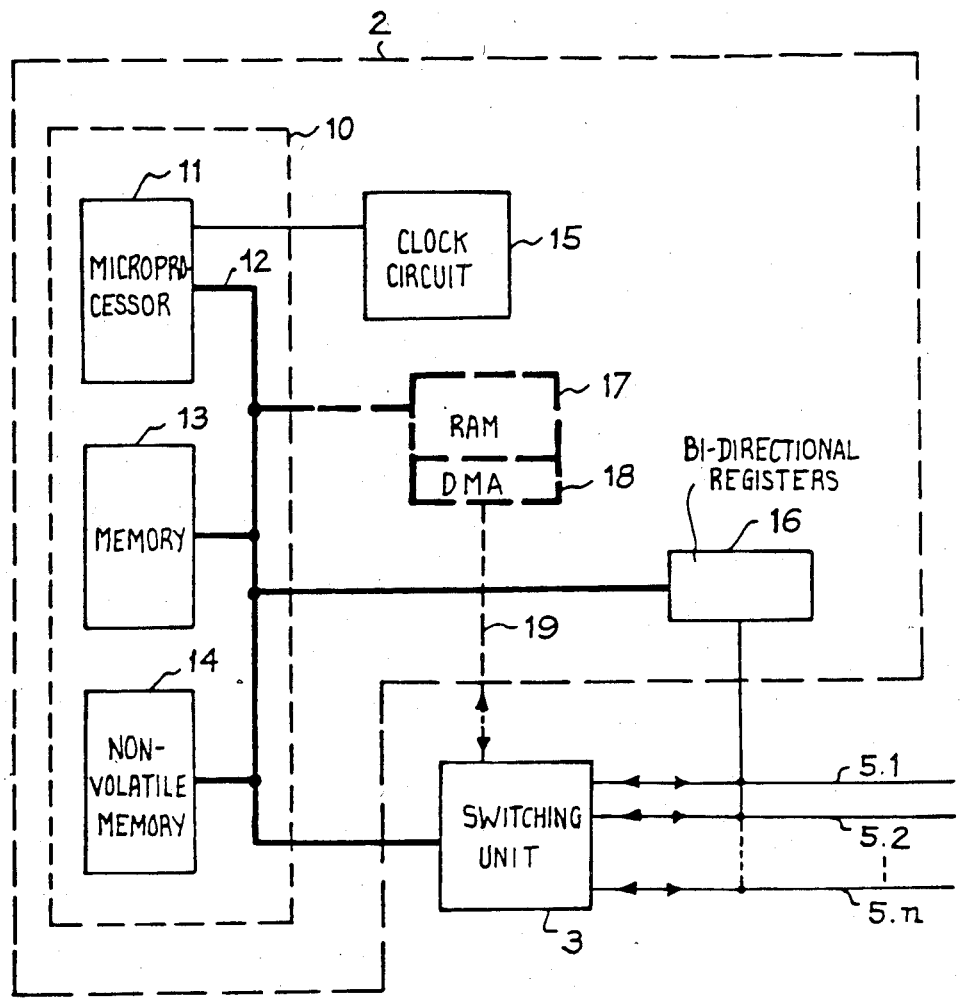
FIG. 2 a block diagram of the central processing unit of the exchange of FIG. 1.

With reference to FIG. 2, a description will now be given of the central processing unit 2, which comprises a central computer 10, essentially comprising a microprocessor 11 connected by a bus 12 to a memory 13 which includes the various telephone programs and telematic programs, and to a non-volatile memory 14 used for protecting certain data of functions inherent in the telephone service (e.g. summary numbers, automatic recalls, categories, service classes, etc). Microprocessor 11 is also connected to a timing circuit 15 permitting the synchronization of the complete exchange 1. Thus, bus 12 is connected to the switching network 3 and within central unit 2, and is also connected to a system 16 of bidirectional registers, which are themselves connected to the bidirectional junctions 5.1 to 5.n so that, under the control of computer 10, they read certain information of the group of bidirectional junctions 5.1 to 5.n and write certain other information on these same junctions.

According to a constructional variant, shown in broken line form in FIG. 2, the group 16 of registers can be replaced by a random access memory 17 connected to bus 12 and cooperating with a circuit 18 giving direct access to the memory, connected by a bidirectional junction 19 to switching network 3.

Figure 3:
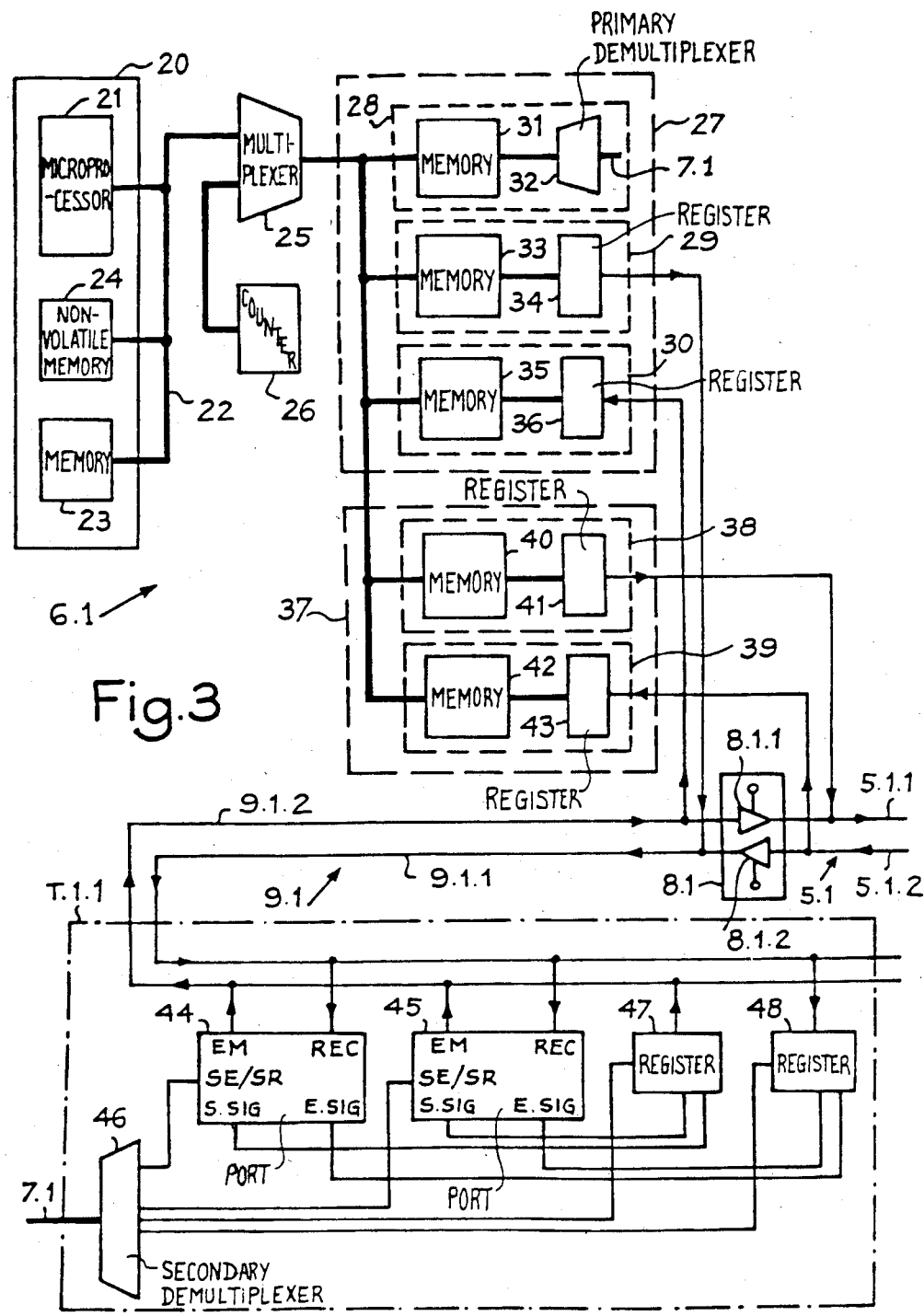
FIG. 3 a block diagram of a rack of the exchange of FIG. 1.

FIG. 3 shows the block diagram of port rack, e.g. rack 4.1.

In the upper part of FIG. 3, it is possible to see the message processing microcontroller 6.1, which incorporates a computer 20, a multiplexer 25, a counter 25, a bus 22, a port selection circuit 27, and a transmission/reception circuit 37. Computer 20 is essentially formed by a microprocessor 21, connected by a bus 22 to a memory 23, containing the various signalling and scanning programs of the rack ports and to a non-volatile memory 24 used for protecting certain data of functions inherent in the ports and the time slots of the bidirectional PCM junction 5.1. Bus 22 is connected to one input of a two-input multiplexer 25. The other input of multiplexer 25 is connected to a time slot counter 26. The output of multiplexer 25 is connected to the input of a port selection circuit 27. The latter is constituted by a transmission and reception time selection circuit 28, a circuit 29 for transmitting signals in the direction of the ports, and a circuit 30 for transmitting signals coming from the ports. The inputs of circuits 28, 29 and 30 are all connected to the output bus of multiplexer 25.

Circuit 28 comprises a memory 31, followed by a primary demultiplexer 32. For each time slot of the port rack, memory 31 has the address of the card and the port to be selected. The primary demultiplexer 32 serves to select one of the port cards T.1.1 to T.1.m and its output is connected to bus 7.1. Circuit 29 comprises a memory 33, followed by a register 34 having parallel inputs and a series output. For each time slot, memory 33 has the data corresponding to the signalling to be transmitted to the port, whose address is located in memory 31. Circuit 30 comprises a memory 35, preceded by a register 36 having a series input and parallel outputs. For each time slot, memory 35 has the data corresponding to the message coming from the port, whose address is located in memory 31. Registers 34 and 36 are connected to bidirectional junction 9.1. The output of register 34 is connected to unidirectional junction 9.1.1 in the direction of the ports, whilst the input of register 36 is connected to the unidirectional junction 9.1.2 coming from the ports, junctions 9.1.1 and 9.1.2 forming junction 9.1.

The output bus of multiplexer 25 is also connected to a circuit 37 for transmitting messages between the port rack 4.1 to central computer 10. Circuit 37 includes a circut 38 for transmitting signalling messages from rack 4.1 to central computer 10, and a circuit 39 for transmitting signalling messages from the central computer 10 to rack 4.1. Circuit 38 comprises a memory 40 for storing signalling messages from microcontroller 20 to central computer 10. Memory 40 is followed by a register 41 with parallel inputs and a series output. Circuit 39 comprises a memory 42 for storing messages from the central computer 10, said memory 42 being preceded by a register 43 with a series input and parallel outputs. The two memories 40 and 42 are connected to the output bus of multiplexer 25, whilst the output of register 41 and the input of register 43 are connected to the bidirectional junction 5.1. The latter comprises a unidirectional junction 5.1.1 connecting the output of register 41 to a corresponding input of the switching network 3, and another unidirectional junction 5.1.2 connecting a corresponding output of the switching network 3 to the input of register 43.

Circuit 8.1 comprises a three-state logic amplifier 8.1.1 connecting junction 9.1.2 to junction 5.1.1, and another three-state logic amplifier 8.1.2 connecting juction 5.1.2 to junction 9.1.1. The logic amplifiers 8.1.1 and 8.1.2 are controlled in per se known and not shown manner by computer 20.

Several, e.g. 16, port cards, such as cards T.1.1, shown at the bottom of FIG. 3, are connected to bus 7.1. Each port card has several, e.g. 4, 8 or 16 ports. In the drawing, only two ports, namely ports 44 and 45 are shown for card T.1.1. and are constituted by subscriber's line equipment, network junctors, etc. Each port card, such as card T.1.1, also has a secondary port selection demultiplexer 46, a register 47 with parallel inputs and a series output and a register 48 with a series input and parallel outputs. The input of the secondary demultiplexer 46 is connected to bus 7.1 and its different outputs are in each case connected to a selection input SE/SR of each of the ports of the card, as well as to the validation input of register 47 and register 48. Each port has a signalling or message input E.SIG for receiving the message from the rack computer 20, and a signalling output S.SIG for transmitting the signals to the rack computer 20. Each signalling input E.SIG is connected to junction 9.1.1 by means of register 48 and each signalling output S.SIG is connected to junction 9.1.2 by register 47. Finally each port has a data transmission output EM and a data reception input REC. The outputs EM of all the ports are connected to junction 9.1.2 and the inputs REC of all the ports are connected to junction 9.1.1.

When a calling party (telephone or network) connected to one of the ports of the rack wishes to be linked with a call party (another telephone or network, in the same card or in another card of the same rack) connected to another port of the same rack, e.g. by loop closure, the calling party supplies a corresponding signal, on a time slot of junction 9.1.2, by output S.SIG of its port to rack computer 20, via the corresponding register 47 and via register 36 and memory 35 of the corresponding circuit 30. In the manner described hereinafter, computer 20 transmits this request to the central computer 10 which, in the manner described hereinafter, informs computer 20 of the same rack thereof. Computer 20 transmits a call signal to input E.SIG of the port of the called party via memory 33, register 34 and register 48 of the port card of the called party. As soon as the called party has informed computer 20, via a return signal, that he is ready to receive the calling party, the rack computer permits the exchange of PCM information between the calling party and the called party, during the time slots of junction 9.1. The selection of the transmission and reception times takes place by activating input SE/SR of the port having to transmit and receive during the chosen time slot of junction 9.1, said activation taking place in the following manner. Having chosen a time slot of junction 9.1, computer 20 writes into the memory 31 of its rack, at the address corresponding to said time slot, the address of the port having to transmit the data on junction 9.1.2 during this time slot and the address of the port having to receive the data present on junction 9.1.1 during the same time slot. Thus, memory 31 supplies the address of the selected port, said address being validated by the time slot counter 26, which on the same time slot of junction 9.1 also validates the information relative to the selected port. Obviously, multiplexer 25 operates synchronously with the central clock 15 of the exchange, so as to alternately permit the passage of the information transmitted by computer 20 on bus 22 and the information from counter 26. The address of the selected port includes the subaddress of the card in which is located said port and the subaddress of the particular ports within the card. The first subaddress is processed by the primary demultiplexer 32 and the second by the secondary demultiplexer 46 of the card in question. The address of the selected port also includes information of the "MIC data" or "signalling message" type, in order to indicate to the selection demultiplexer 46, either the data inputs-outputs REC-EM, or the signalling inputs-outputs E.-SIG-S.SIG across registers 48 and 47.

In order to bring about a bidirectional conversation (or data exchange in more general terms) between two ports, e.g. ports 44 and 45, it is necessary to use two time slots of junction 9.1. The first time slot is selected for port 44 and the second for port 45. Output EM of port 44 transmits its data on the first time slot of junction 9.1.2, said data being transmitted by means of junction 5.1.1 to junction 9.1.1 during the second time slot and are received by input REC of port 45. Under the control of the central computer 10, the correspondence between the first time slot of the junction 9.1.2 and the second time slot of junction 9.1.1 takes place by means of switching network 3. For this purpose, it will be necessary to instruct central processor 10 beforehand to establish correspondence between the first time slot of junction 9.1.2 and the second time slot of junction 9.1.1. For this purpose, the computer 20 of the rack containing the ports in question could have supplied a message to computer 10 via circuit 38, using the message time slot of junction 5.1. Advantageously, the signalling time slot of junction 5.1 is time slot 16, as is the case with the standardized PCM junctions. The message in question is supplied by computer 20 to memory 40 and is dumped into register 41 at the desired time and is then supplied to junction 5.1.1. This message is then collected by register 16 (or is fed into the random access memory 17 in the case of the aforementioned constructional variant), said register 16 collecting all the information on signalling time slots 16 of junctions 5.1 to 5.n. Central computer 10 then supplies a message to the computer 20, to indicate to it that correspondence has been brought about between the indicated time slots. This message is transmitted, via register 16, to junction 5.1.2. The return message is collected by register 43 and stored by memory 42, which is read by microprocessor 21. In the same way, output EM of port 45 transmits data on the second time slot of junction 9.1.2, said data being transmitted via junction 5.1.1 to junction 9.1.1 during the first time slot, by means of the switching network 3, which links the second time slot of junction 9.1.1 with the first time slot of junction 9.1.2.

If the called party belongs to a port rack differing from the port rack of the calling party computer 20 requests, in the form of a message transmitted to the central computer 10, via the signalling time slot 16 of the junction, such as junction 5.1, that the second computer 20 of the port rack on which the called party depends, he is being called by the particular calling party. To this end, the central computer 10 transmits a message to the second computer, in order that the latter supplies a call signal to input S.SIG of the port of the called party, after having chosen a time slot of junction 9.1 of the second rack. As soon as the called party has informed the second computer 20 via a return signal that he is ready to receive the calling party, the second computer 20 informs the central computer 10 which, then informs the computer 20 of the calling party. As each port rack computer 20 has chosen a time slot, the central computer 10 brings about correspondence between these time slots via switching network 30.

According to a preferred embodiment of the invention, each computer 20 can control two PCM junctions, such as junction 9.1, by exchanging the signal on the signalling time slot which, in the present case, is time slot 16. In the case of PCM junctions operating at 2.048 Mbits/s, each of the two junctions controlled by computer 20 can be connected to 30 networks with a traffic of 1 erlang, or 100 subscriber's sets with a traffic of 0.2 erlang and a 1% loss. Each port rack thus makes it possible to receive 60 networks with a traffic of 1 erlang or 200 subscriber's sets with a traffic of 0.2 erlang, or any other intermediate mixed value of networks and sets.

Central computer 10 is able to carry out dialogue, by an exchange of messages with the different rack computers, such as computer 20, via switching network 3 and the different junctions connecting the racks to the said switching network. According to a preferred embodiment of the invention, use is made of a switching network with 8 incoming junctions and 8 outgoing junctions, which makes it possible to connect up to 4 port racks.

The signalling exchange traffic between the ports and the microcomputer 20 of each rack increases in a substantially proportional manner to the number of ports. However, this does not apply to the message exchange traffic between central computer 10 and the different rack microcomputers, said traffic generally remaining very low. The advantage of the solution according to the invention is that all the "telephone" traffic (i.e. switching instructions processed by central computer 10 and supplied in message form to the different computers, such as computer 20) is processed by a single central processor, whereas the signalling exchange traffic is distributed over several specialized processors, such as computer 20, whose number is a function of the number of ports. Moreover, the signal processing programs occupy a small memory volume, so that their duplication does not lead to an increase in costs, whereas the telephone programs occupy a large memory volume (several dozen to several hundred thousand instructions) and are never duplicated in the aforementioned preferred embodiment, whereas in multiprocessor systems, it is often necessary to duplicate them, in order to minimize the information traffic on the bus common to the different processors.

The capacity of the exchange according to the invention with an 8×8 switching network can consequently range from 8×8=240 networks with a traffic of 1 erlang per network to 8×100=800 subscriber's sets with a traffic of 0.2 erlang per set. According to an advantageous embodiment, the exchange could have 60 networks and 600 sets.

What is claimed is:

1. An electronic digital PCM time division exchange connecting subscribers to each other and to said exchange, comprising:
   a central processing unit;
   a switching network connected to said central processing unit; and
   at least one rack connected to said switching network, each rack including:
   a first PCM bidirectional junction connecting said rack to said switching network;
   a tri-state circuit connected to said first PCM bidirectional junction;
   at least one port card, each including at least one port adapted to connect subscribers to said exchange;
   a second PCM bidirectional junction connecting said at least one port card to said tri-state circuit; and
   a message processing microcontroller, connected to said at least one port card and to said tri-state circuit and to said first and second PCM bidirectional junctions.

2. An exchange according to claim 1, wherein said central processing unit includes at least one bidirectional register connected to all of the first PCM bidirectional junctions.

3. An exchange according to claim 1 wherein said central processing unit includes a random-access memory and a circuit giving direct access to said memory, connected to said switching network by a third bidirectional junction.

4. An exchange according to claim 1 wherein said message processing microcontroller includes:
a computer;
a time interval counter;
a multiplexer connected to said computer and to said counter;
a port selection circuit connected to said multiplexer and to said second PCM bidirectional junction; and
a central processing message transmitting circuit connected to said multiplexer and to said first PCM bidirectional junction.

5. An exchange according to claim 4 wherein said port selection circuit includes:
a transmission and reception time selection circuit connected to said multiplexer;
a signal transmission circuit connected to said multiplexer and to said second PCM bidirectional junction; and
a signal reception circuit connected to said multiplexer and to said second PCM bidirectional junction.

6. An exchange according to claim 5 wherein said central processing message transmitting circuit includes:
a message transmission circuit connected to said multiplexer and to said first PCM bidirectional junction; and
a message reception circuit connected to said multiplexer and to said first PCM bidirectional junction.

7. An exchange according to claim 6 wherein message and signals are exchanged during time intervals, each said rack being assigned a group of time intervals, and wherein said transmission and reception time selection circuit includes:

a memory connected to said multiplexer, said memory storing, for each said time interval assigned to said rack, an address of a port card and a port which is to transmit/receive a message; and
a first demultiplexer connected to said memory and having an output, for selecting the port card which is to transmit/receive a message.

8. An exchange according to claim 6 wherein said signal transmission circuit and said message transmission circuit each include:
a random access memory connected to said multiplexer; and
a parallel-in, serial-out register connected to said random-access memory.

9. An exchange according to claim 6 wherein said signal reception circuit and said message reception circuit each include:
a random access memory connected to said multiplexer; and
a serial-in, parallel-out register connected to said random-access memory.

10. An exchange according to claim 7 wherein each said port card includes:
a second demultiplexer connected to said first demultiplexer output;
a first register connected to said second demultiplexer and having at least one parallel input and a serial output which is connected to said second PCM bidirectional junction;
a second register connected to said second demultiplexer and having at least one parallel output and a serial input which is connected to said second PCM bidirectional junction; and
at least one port, each port including:
a port transmission/reception selection input connected to said second demultiplxer;
a data transmission output connected to said second PCM bidirectional junction;
a data reception input connected to said second PCM bidirectional junction;
a signal output port connected to said at least one parallel input of said first register; and
a signal input port connected to said at least one parallel output of said second register.

* * * * *